United States Patent
Rittmann et al.

(10) Patent No.: US 9,937,878 B2
(45) Date of Patent: Apr. 10, 2018

(54) LOAD COMPARTMENT COVER HAVING SOUND-ABSORBING CHARACTERISTICS

(71) Applicant: FORD GLOBAL TECHNOLOGIES, LLC, Dearborn, MI (US)

(72) Inventors: Jan Michael Rittmann, Köln (DE); Andreas Bock, Monheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 15/003,303

(22) Filed: Jan. 21, 2016

(65) Prior Publication Data
US 2016/0214549 A1 Jul. 28, 2016

(30) Foreign Application Priority Data
Jan. 27, 2015 (DE) .......... 10 2015 201 320

(51) Int. Cl.
*B60R 13/08* (2006.01)
*B60R 5/04* (2006.01)

(52) U.S. Cl.
CPC .......... *B60R 13/0823* (2013.01); *B60R 5/047* (2013.01)

(58) Field of Classification Search
CPC ........ B60R 5/047; B60R 5/04; B60R 13/0823
USPC ...................................... 296/24.43
See application file for complete search history.

(56) References Cited

U.S. PATENT DOCUMENTS

| | | | |
|---|---|---|---|
| 7,559,593 B2 * | 7/2009 | Luik ...................... | B60R 21/06 296/24.43 |
| 8,419,102 B2 * | 4/2013 | Takemura ............... | B60R 5/047 160/290.1 |
| 8,573,358 B2 | 11/2013 | Nonogi et al. | |
| 2008/0020199 A1 * | 1/2008 | Augele ............... | B60R 13/0815 428/312.6 |

FOREIGN PATENT DOCUMENTS

| | | |
|---|---|---|
| DE | 19833031 C1 | 2/2000 |
| DE | 102008017084 B4 | 12/2011 |

(Continued)

OTHER PUBLICATIONS

English machine translation of DE102008017084B4.
(Continued)

*Primary Examiner* — Joseph D Pape
*Assistant Examiner* — Dana D Ivey
(74) *Attorney, Agent, or Firm* — Vichit Chea; King & Schickli, PLLC

(57) ABSTRACT

The invention relates to a load compartment cover having sound-absorbing characteristics. A load compartment is provided between the rear seats and a tailgate. The load compartment cover is embodied from a sound-absorbing partition that is arranged in a space above a base of the load compartment and is embodied from a material that is in part permeable to sound waves. A load compartment cover of this type is to be easily handled in practice and is not to comprise any disadvantages associated with known load compartment covers. This is achieved by virtue of the fact that the partition is formed from multiple, preferably two, thin sheets that are arranged spaced apart one above the other. The thin sheets are provided with a micro perforation and only one air cushion is provided between the thin sheets.

17 Claims, 2 Drawing Sheets

(56) References Cited

FOREIGN PATENT DOCUMENTS

Figure 1A:
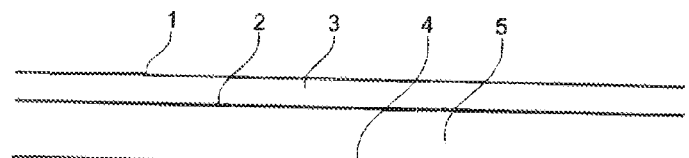

EP           0816583 A1    1/1998
EP           1884409 A1    2/2008

OTHER PUBLICATIONS

English Machine Translation of DE19833031C1.
English Machine Translation of EP0816583A1.
English Machine Translation of EP1884409A1.

\* cited by examiner

LOAD COMPARTMENT COVER HAVING SOUND-ABSORBING CHARACTERISTICS

TECHNICAL FIELD

This document relates to a load compartment cover for vehicles having a load compartment that is provided between the rear seats and a tailgate. That load compartment cover is embodied from a sound-absorbing partition that is arranged in a space above the base of the load compartment and is embodied from a material that is in part permeable to sound waves.

BACKGROUND

A known load compartment cover of the mentioned type (DE 10 2008 017 084 B4) is to be used for the purpose of providing an audio system of a vehicle in such a manner that the audio system renders possible a natural audio experience in particular in the range of lower frequencies and to a large extent avoids the formation of standing waves. For this purpose in the case of the known system, a plate is arranged above the load compartment and that plate is embodied from a rigid mesh, preferably a metal mesh of sufficient rigidity and mass. That mesh is provided with a textile, felt-like or also leather or synthetic leather-type cover.

Helmholtz resonators are also known as sound absorbers (Wikipedia Helmholtz resonator) for improving the general acoustics of the compartment. Helmholtz resonators essentially comprise a vibrating mass and a resilient element. The sound energy that occurs is converted into kinetic energy of the mass. The maximum absorption occurs in the range of the resonant frequency where the mass vibrates most intensely. The vibrating mass is the air that is located in the holes. The volume of air is delimited by means of plates embodied from plywood, gypsum, particle board, synthetic leather or also thin sheets. The volume of air that is enclosed behind the plate acts as a resilient element. The advantage of resonance absorbers of this type is their high capacity to absorb sound, in particular in the case of low frequencies that often occur in the passenger compartments of motor vehicles, in particular when using audio systems.

In addition, very effective, multilayer sound-absorbing plates are known (U.S. Pat. No. 8,573,358 B2). Such plates are embodied from micro perforated thin sheets and a wire mesh is present between said plates in order to maintain the spacing between the thin sheets.

SUMMARY

The object of the invention is to provide a sound-absorbing load compartment cover that in practice is easily handled and does not comprise any of the disadvantages associated with known load compartment covers.

The partition is formed from multiple thin sheets that are arranged preferably spaced apart one above the other. At least one of the thin sheets is provided with a micro perforation and only one air cushion is provided between the thin sheets. Multiple thin sheets or all the thin sheets can comprise a micro perforation. A micro perforation is to be understood typically as a hole diameter smaller than 1 mm.

It became apparent in in-house tests that spacers comprising a large surface area are not required between the thin sheets and that the desired sound absorption also then occurs if only one air cushion is provided between the thin sheets. Only when omitting the spacer of this type is it possible to comfortably handle the sound-absorbing partition that is provided for a load compartment cover.

As a consequence, it is possible to wind the thin sheets when not in use and to keep the volume of the winding small which is a fundamental prerequisite for a load compartment cover in the automotive industry.

A common cassette can be provided to receive the thin sheets and the thin sheets can be selectively wound or unwound in that cassette. Owing to the fact that it is not necessary to provide spacers comprising a large surface area for the thin sheet, the wound volume can be kept extremely small so that conventional cassettes can be used for winding and unwinding known load compartment covers.

A first exemplary embodiment of the invention provides that a special spring-loaded winding spool is provided in the cassette for each thin sheet and that the winding spools are arranged spaced apart one above the other.

In the case of this embodiment, the thin sheets can be drawn out from the spring-loaded winding spools and can be tensioned against the resilient loading of the winding spool so that the thin sheets can be held in their predetermined spacing.

A second exemplary embodiment of the invention provides that a single spring-loaded winding spool is provided in the cassette and the thin sheets can be wound and unwound jointly on said winding spool. At least one spacer is arranged between the thin sheets on the or near the exit of the cassette. When drawing out the thin sheets from the cassette, the thin sheets are separated from one another with the aid of the spacer and are held permanently spaced apart when pulling the thin sheets tight against the resilient force of the winding spool.

For these two exemplary embodiments, a common hand grip can be provided for actuating the thin sheets. More specifically, the thin sheets are fastened to the hand grip, one above the other, in a predetermined spacing with respect to one another.

A third exemplary embodiment of the invention is characterized by virtue of the fact that a single spring-loaded winding spool is arranged in the cassette and it is possible to wind and unwind a first end of the thin sheet on said winding spool. A second end of the thin sheet is fastened to the cassette in a space below or above the first end. The thin sheet is guided by way of a deflecting roller that is provided on the hand grip.

In this exemplary embodiment, it is also possible in a particularly elegant manner for two thin sheets spaced apart one above the other to be drawn from one cassette. The deflecting roller is used as a spacer in the region of the cassette. Preferably, the spacing is between the upper side of the winding spool and the fastening site of the second end of the thin sheet and in the region of the hand grip.

This embodiment also offers the possibility of producing the thin sheet from two part pieces that are embodied so as to be different over the length that said thin sheet that can be drawn out so that when the cover is in the drawn-out state two different thin sheets can be arranged spaced apart one above the other in order to provide the sound-absorbing effect in an optimal manner.

The winding spool can comprise self-stopping drives so that the winding spools can likewise be handled as in the case of known, simple, flexible load compartment covers similar to a type of latching roller blind.

The thin sheets that are used for absorbing sound and are arranged one above the other can be embodied so as to be identical or also to be different depending upon which requirements are to be fulfilled. The embodiment of the micro perforation can vary both between the thin sheets as well as on a thin sheet itself. Variations of the micro perforation include changes to the spacing of the holes, the shape of the holes, the diameter of the holes and the arrangement of the holes on the thin sheet.

In each case, however, the thin sheets should only comprise a thickness of less than 1 mm. In an expedient manner, thin sheets having a thickness of 0.05 to 0.4 mm and preferably having a thickness of 0.2 to 0.4 mm are used. The hole diameter of the micro perforation should be smaller than 1 mm, wherein diameters between 0.1 mm to 0.4 mm are preferred.

In addition, it is also possible so as to optimize the sound absorption to vary the spacings of the holes of the micro perforation, wherein the spacings should preferably be in the magnitude of 2 to 10 mm.

It is possible to vary the spacing between the thin sheets in dependence upon the application and the requirements.

In addition, the cassette that receives the thin sheets can also be adjusted in terms of height relative to the base of the load compartment in order to provide optimal sound-absorbing conditions.

BRIEF DESCRIPTION OF THE DRAWING FIGURES

Figure 1B:
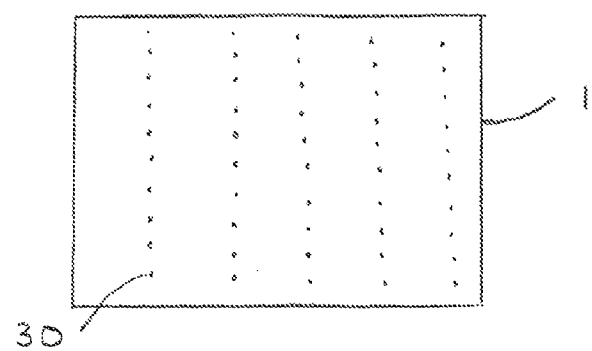
Figure 2:
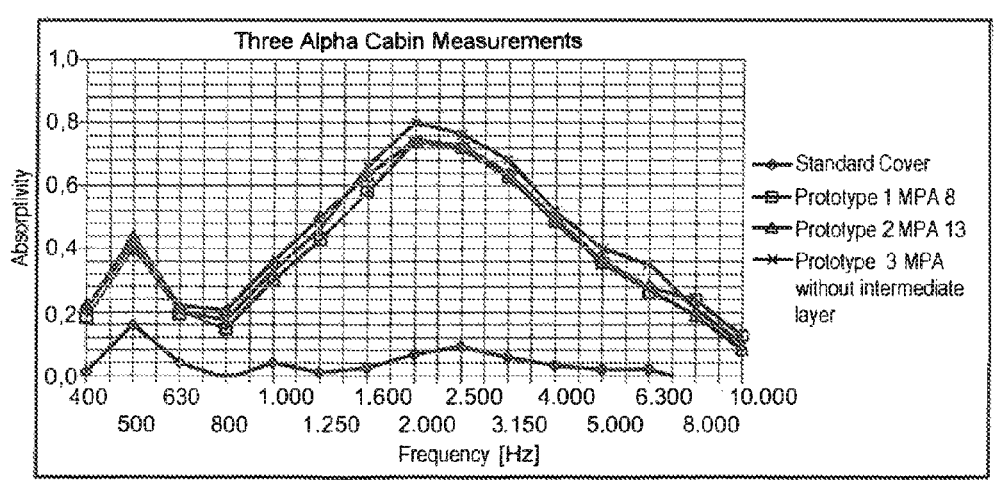
Figure 3:
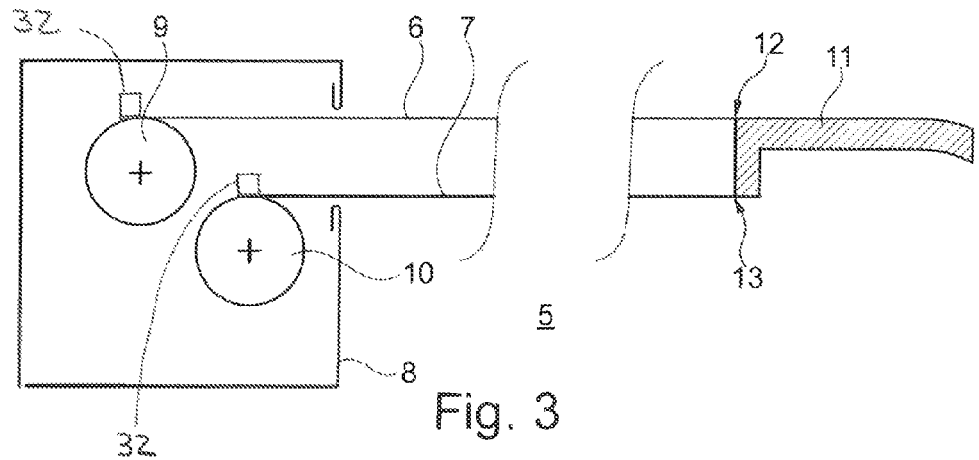
Figure 4:
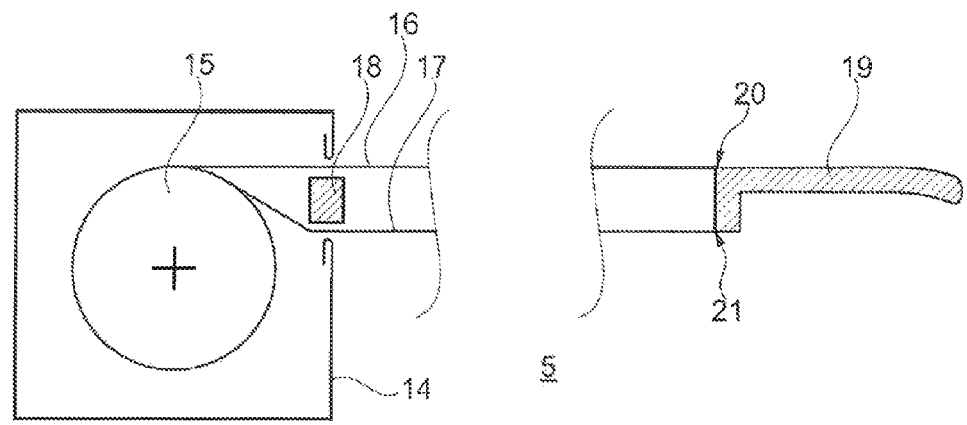
Figure 5:
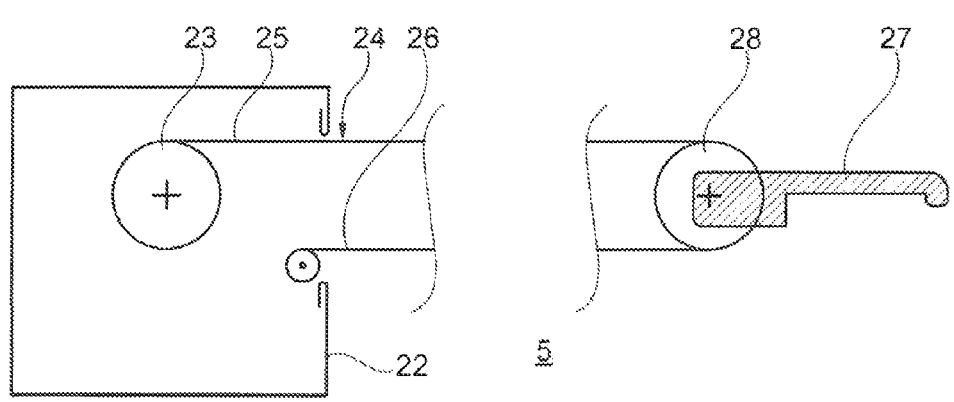

The invention is illustrated in the drawing in an exemplary manner and is described in detail with reference to the drawing. In the figures:

FIGS. 1A and 1B illustrate schematically a load compartment cover comprising two thin sheets that are arranged one on top of the other and have micro perforations, FIG. 2 illustrates a diagram, in which the absorption coefficient is illustrated over the sound frequency for various load compartment covers, FIG. 3 illustrates a first exemplary embodiment of a technical embodiment of the invention, FIG. 4 illustrates a second exemplary embodiment of the technical embodiment of the invention, and FIG. 5 illustrates a third exemplary embodiment of the technical embodiment of the invention.

DETAILED DESCRIPTION

In accordance with the schematic illustration in FIGS. 1 and 2 of the drawing, a load compartment cover is provided for vehicles having a load compartment 5 that is arranged between the rear seats and a tailgate. That cover is embodied from a sound-absorbing partition that is formed from two thin sheets 1 and 2 that are arranged spaced apart one on top of the other. A free space in the form of an air cushion 3 is provided between the upper thin sheet 1 and the lower thin sheet 2. The two thin sheets 1 and 2 are arranged in a space above the base 4 of the load compartment 5.

The two thin sheets 1 and 2 are embodied from material that is in part permeable to sound waves and the thin sheets are provided with a micro perforation 30.

The thin sheets 1 and 2 are in a tensioned state so that the spacing between the thin sheets is approximately constant over their entire length so that the air cushion 3 that is required for the absorption of sound is provided.

In practice, the thin sheets 1 and 2 should comprise a thickness of less than 1 mm. In tests, thin sheets having a thickness of 0.05 to 0.4 mm have been proven reliable. Thin sheet thicknesses of 0.2 to 0.4 mm are preferred. The hole diameter of the micro perforation should be smaller than 1 mm, wherein diameters between 0.1 mm to 0.4 mm are preferred.

The spacing of the holes of the micro perforation is in part dependent upon which sound wave frequency is to be damped the most. For the sound level that is to be experienced in motor vehicles, the spacing of the holes of the micro perforation should be between 2 and 10 mm.

The spacings between the upper thin sheet 1 and the lower thin sheet 2 can be varied so as to optimize the absorption of sound, and the spacing of the partition, which is embodied from the two thin sheets 1 and 2, with respect to the base 4 of the load compartment 5 can be varied.

The absorption coefficient over the sound frequency is illustrated for various load compartment covers in the diagram in FIG. 2.

The lower curve (standard cover) illustrates the absorption curve over the sound frequency in the case of a conventional cover that is embodied from a simple flexible plane.

The three upper curves represent load compartment covers that make use of the principle of the Helmholtz Resonator. The two thin sheets 1 and 2 that are provided with micro perforation form a delimitation of the vibrating air mass that communicates with the air cushion 3 that is used as a resilient element. The sound energy that occurs is to a large extent converted into kinetic energy of the mass and consequently is absorbed by means of the viscous friction on the hole edges.

In the case of the curve "Prototype 1 MPA 8" and the curve "Prototype 2 MPA 13", an intermediate layer was provided in each case between the two thin sheets 1 and 2 and the thin sheets 1 and 2 are held at a precise spacing relative with respect to one another by means of said intermediate layer that is simultaneously used as a resilient element.

One test without an intermediate layer of this type in accordance with "Prototype 3 MPA" clearly illustrates that an intermediate layer as was hitherto typical in sound absorption plates is not necessary at all since the three curves extend at approximately the same level.

Only on the basis of this acquired knowledge, namely that a costly intermediate layer is not required between the thin sheets 1 and 2, does this principle become of interest for load compartment covers since it is now no longer necessary to provide heavy, rigid absorption plates that are cumbersome to stow away when not in use.

On the basis of this acquired knowledge, elegant and expedient solutions for load compartment covers are now possible as are illustrated schematically as examples in FIGS. 3 to 5.

In the case of the first exemplary embodiment, in accordance with FIG. 3 a common cassette 8 is provided to receive the flexible thin sheets 6 and 7. A special, spring-loaded winding spool 9 or 10 is installed in the cassette 8 for each thin sheet 6 or 7. The two winding spools 9 and 10 are arranged spaced apart, one above the other, so that the two thin sheets 6 and 7 can be drawn out from the cassette 8 horizontally and in a vertical spacing with respect to one another. The two thin sheets 6 and 7 are fastened to a common hand grip 11, wherein the two fastening sites 12 and 13 are arranged on the hand grip 11 in the same spacing with respect to one another as the two winding spools 9 and 10 in order to maintain the spacing between the thin sheets 6 and 7.

If the two thin sheets 6 and 7 are drawn out of the cassette with the aid of the hand grip 11 against the resilient pre-tension of the winding spool 9 and 10, the two thin sheets 6 and 7 thus always remain in the same spacing arranged one above the other so that the air cushion 3 that is required for the absorption of sound remains between the two thin sheets.

The spring-loaded winding spools 9 and 10 are fitted with a self-stopping drive 32 so that the two thin sheets 6 and 7 can be drawn in and drawn out with the aid of the hand grip 11 similar to a type of latching roller blind.

In the case of the second embodiment of the invention that is illustrated in FIG. 4, only one spring-loaded winding spool 15 is provided in a cassette 14 and it is possible to wind or unwind the two thin sheets 16 and 17 jointly on said winding spool.

In order to also be able to maintain a predetermined spacing between the two thin sheets 16 and 17 in this embodiment, a spacer 18 is arranged between the two thin sheets 16 and 17 on or near the exit of the cassette 14. The upper thin sheet 16 is guided along above the spacer 18 and the lower thin sheet 17 is guided along below the spacer 18 so that the height of the spacer 18 predetermines the spacing between the two thin sheets 16 and 17.

In the case of this exemplary embodiment, a common hand grip 19 is also provided for the two thin sheets 16 and 17. In order to also maintain the spacing of the two thin sheets 16 and 17 relative to one another on the side of the hand grip 19, fastening sites 20 and 21 for the thin sheets 16 and 17 are likewise provided on the hand grip 19 as in the case of the exemplary embodiment that is illustrated in FIG. 3 and these fastening sites are arranged precisely in the spacing of the predetermined intermediate space between the thin sheets 16 and 17.

The handling of this exemplary embodiment corresponds to the first exemplary embodiment that is illustrated in FIG. 3 since the first exemplary embodiment merely needs the hand grip to be actuated and the thin sheets to be drawn out of the cassette 14 against the resilient tension of the winding spool 15. The hand grip can then be latched on the end of the load compartment that lies opposite the cassette 14 in a holder that is not further illustrated in the drawing.

In the case of the third exemplary embodiment of the invention that is illustrated in FIG. 5, only one single spring-loaded winding spool 23 is in turn arranged in a cassette 22. It is possible to wind and unwind a first end 25 of a thin sheet 24 on this winding spool 23 while the second end 26 of the thin sheet 24 is fastened in a space below the first end 25 on the cassette 22. The thin sheet 24 extends over a deflecting roller 28 that is provided on a hand grip 27, the diameter of said deflecting roller corresponding precisely to the predetermined spacing between the two thin sheet ends 25 and 26.

In the case of the exemplary embodiments in accordance with FIGS. 3 and 4, the thin sheets 6 and 7 or 16 and 17 can be readily embodied so as to be different. Said thin sheets can comprise different strengths and can be provided with a different micro perforation, wherein the respective embodiment conforms to the predetermined requirements.

The same can also be achieved in the case of the exemplary embodiment in accordance with FIG. 5, wherein only one single related thin sheet 24 is used. In the case of this exemplary embodiment, it is however also possible to divide the thin sheet 24 into two different sections so that in the case of the wound thin sheet 24 different sections can lie one above the other. This is by way of example possible by virtue of the fact that two thin sheets that are embodied so as to be different are connected to one another or that the thin sheet 24 is fitted with sections that are embodied so as to be different.

In all three exemplary embodiments in accordance with FIGS. 3 to 5, the cassettes 8, 14 and 22 can he adjusted in terms of their height so that the spacing of the sound-absorbing thin sheets can be varied above the base 4 of the load compartment 5.

In addition it is also possible to vary the spacing between the thin sheets, wherein the respective fastening sites are set on the hand grips and in the region of the cassettes in order to achieve the desired sound-absorbing characteristics of the load compartment cover in accordance with the invention.

Further embodiments of the invention are technically readily possible, wherein it is merely to be ensured that the thin sheets that are equipped with the predetermined characteristics are tensioned in a corresponding spacing with respect to one another over the load compartment.

What is claimed:

1. A load compartment cover for vehicles having a load compartment that is provided between the rear seats and a tailgate, said load compartment cover comprising:
    a sound-absorbing partition that is arranged in a space above a base of the load compartment and is embodied from a material that is in part permeable to sound waves, characterized in that the sound-absorbing partition is formed from multiple thin sheets that are arranged spaced apart one above the other, wherein at least one of the thin sheets is provided with a micro perforation and that only one air cushion is provided between the thin sheets.

2. The load compartment cover as claimed in claim 1, characterized in that the partition is formed from two thin sheets that are arranged spaced apart one above the other.

3. The load compartment cover as claimed in claim 2, characterized in that a common cassette is provided to receive the thin sheets and the thin sheets are selectively wound or unwound in said cassette.

4. The load compartment cover as claimed in claim 3, characterized in that a separate spring-loaded winding spool is provided in the cassette for each thin sheet, wherein the winding spools are arranged spaced apart one above the other.

5. The load compartment cover as claimed in claim 3, characterized in that a single spring-loaded winding spool is provided in the cassette and the thin sheets can be wound and unwound jointly on said winding spool and that at least one spacer is arranged between the thin sheets on the or near the exit of the cassette.

6. The load compartment cover as claimed in claim 5, characterized in that a common hand grip is provided so as to actuate the thin sheets.

7. The load compartment cover as claimed in claim 6, characterized in that the thin sheets are fastened to the common hand grip spaced apart one above the other.

8. The load compartment cover as claimed in claim 3, characterized in that a single spring-loaded winding spool is arranged in the cassette and it is possible to wind or unwind a first end of the thin sheet on said winding spool, that a second end of the thin sheet is fastened to the cassette in a spacing below or above the first end, and that the thin sheet is guided over a deflecting roller that is arranged above a hand grip.

9. The load compartment cover as claimed in claim 8, characterized in that the thin sheet is embodied from two part pieces that are embodied so as to be different over the length that said thin sheet that can be drawn out.

10. The load compartment cover as claimed in claim 9, characterized in that the winding spools comprise self-stopping drives.

11. The load compartment cover as claimed in claim 10, characterized in that the thin sheets comprise a thickness of below 1 mm and in particular a thickness of 0.05 to 0.4 mm.

12. The load compartment cover as claimed in claim 11, characterized in that the micro perforation of a thin sheet comprises variations by means of at least one change in relation to the spacing of the holes, the shape of the holes, the diameter of the holes or the arrangement of the holes on the thin sheet.

13. The load compartment cover as claimed in claim 12, characterized in that the spacings of the holes of the micro perforation that is provided in the thin sheets is between 2 and 10 mm.

14. The load compartment cover as claimed in claim 13, characterized in that the spacing between the thin sheets or between the ends of the thin sheet can be varied.

15. The load compartment cover as claimed in claim 14, characterized in that the cassette that receives the thin sheets is configured to be adjusted in terms of its height relative to the base of the load compartment.

16. The load compartment cover as claimed in claim 1, characterized in that the micro perforation of a thin sheet comprises variations by means of at least one change in relation to the spacing of the holes, the shape of the holes, the diameter of the holes or the arrangement of the holes on the thin sheet.

17. The load compartment cover as claimed in claim 16, characterized in that the spacings of the holes of the micro perforation that is provided in the thin sheets is between 2 and 10 mm.

* * * * *